United States Patent [19]

Tidwell

[11] 4,283,074
[45] Aug. 11, 1981

[54] NARROW TRACK ECONOMY MOTOR VEHICLE

[76] Inventor: Hubert Tidwell, Box 57, Wellington, Utah 84542

[21] Appl. No.: 87,731

[22] Filed: Oct. 24, 1979

[51] Int. Cl.³ .............................................. B62D 9/02
[52] U.S. Cl. ................................... 280/772; 280/109; 280/112 A; 180/267; 74/471 XY
[58] Field of Search ............... 280/112 A, 112 R, 111, 280/263, 267, 97, 772, 109; 180/267

[56] References Cited

U.S. PATENT DOCUMENTS

| 2,001,647 | 5/1935 | Alt | 280/263 |
| 2,887,322 | 5/1959 | DeMonge | 280/112 A |
| 3,704,897 | 12/1972 | Bagge | 280/112 A |
| 4,065,144 | 12/1977 | Winchell | 280/112 A |

Primary Examiner—John P. Silverstrim
Attorney, Agent, or Firm—B. P. Fishburne, Jr.

[57] ABSTRACT

A front wheel drive narrow track passenger and/or cargo vehicle possesses some of the maneuverability of a motorcycle while providing the comparative safety and greater utility of a four wheeled automotive vehicle. Steering and tilting of the vehicle is counteract centrifugal force on curves is under control of a universally movable lever resembling an aircraft joy stick. A vehicle main frame forms a peripheral buffer around the entire vehicle.

4 Claims, 5 Drawing Figures

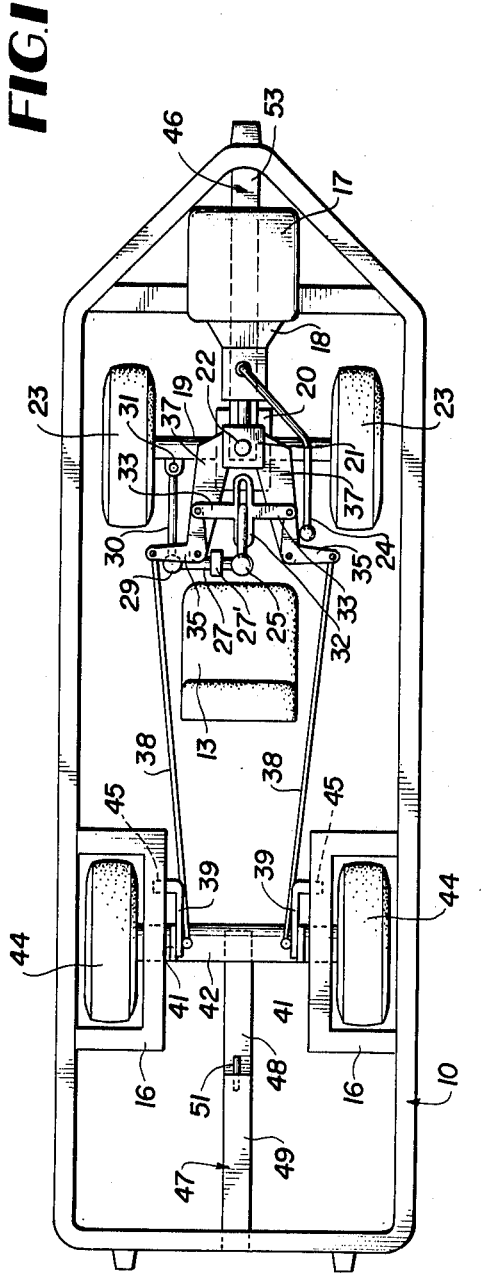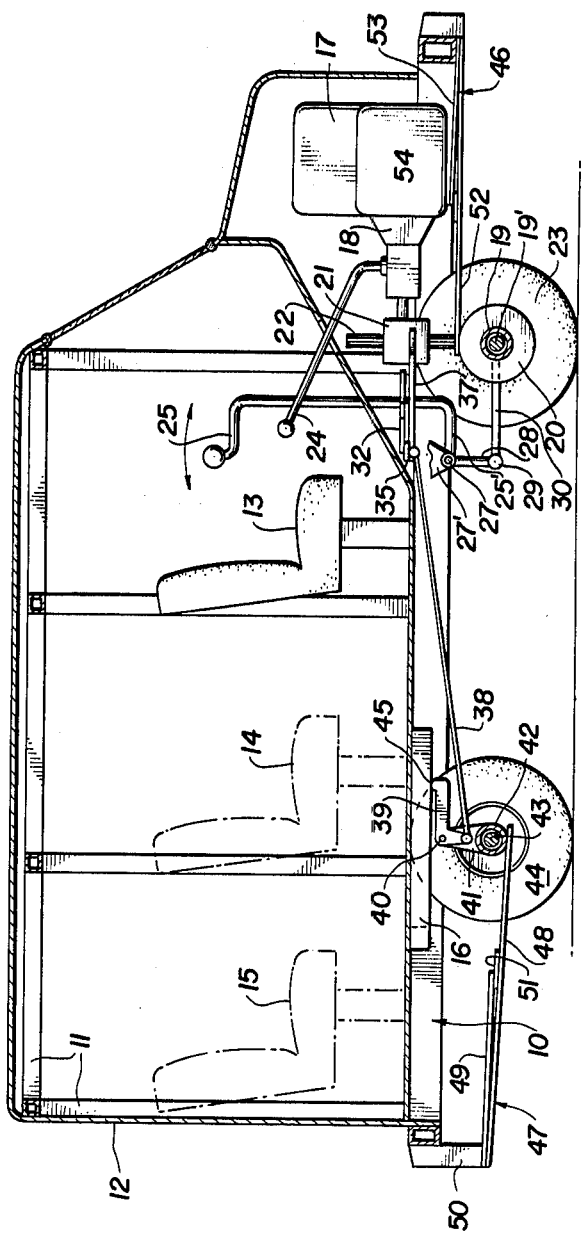

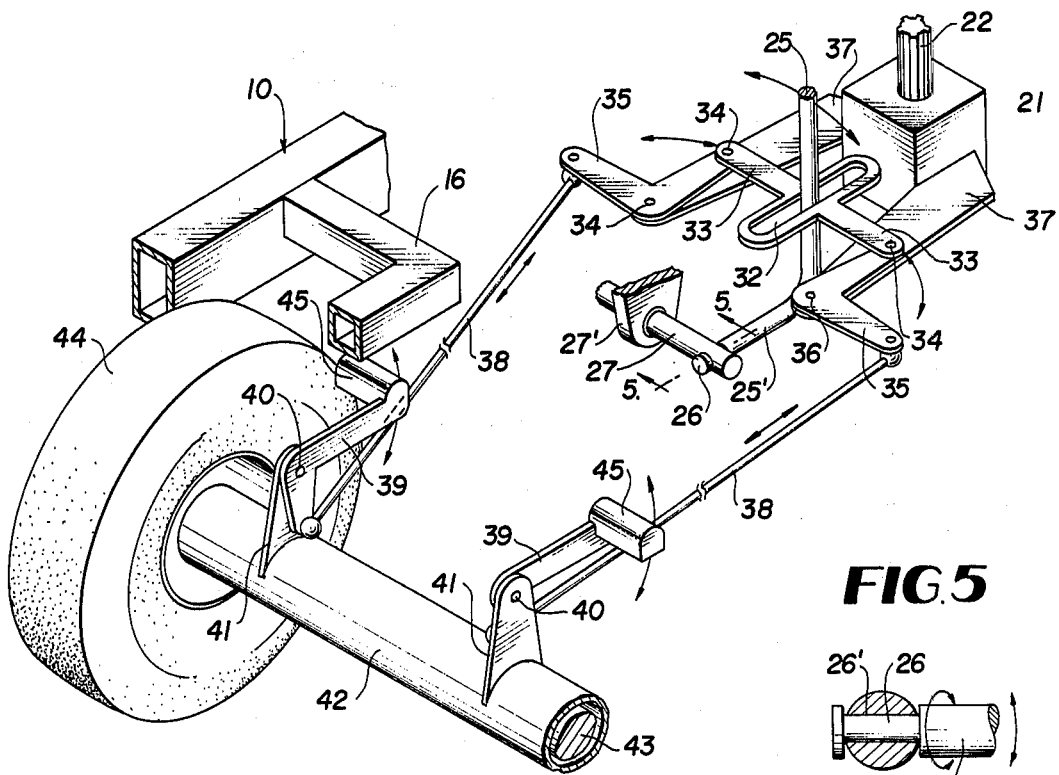
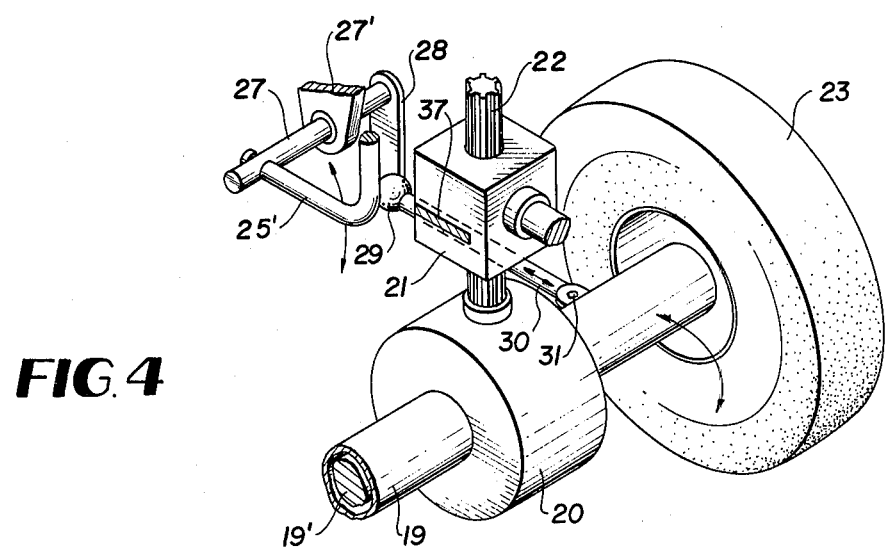

NARROW TRACK ECONOMY MOTOR VEHICLE

BACKGROUND OF THE INVENTION

This invention relates to a safe economy motor vehicle of wide utility and convenience of operation particularly in crowded urban areas. The vehicle has a narrow track of as little as three feet which contributes to its maneuverability and reduces its overall weight markedly. In its operation, the vehicle has a unique steering and lateral tilting mechanism whereby it possesses some of the advantages of a motorcycle while retaining the safety and wider utility of an automotive type vehicle having four wheels.

The objective of the invention is to provide a wholly new class of motor vehicle to meet certain transportation needs which cannot be met by existing vehicles.

SUMMARY OF THE INVENTION

The vehicle embodying the invention is a front wheel drive narrow track four wheel passenger and/or cargo vehicle whose main frame forms a safety buffer around its entire perimeter. A universal control lever resembling an aircraft joy stick swings fore and aft to steer the front axle of the vehicle and swings laterally to operate a linkage which can tilt the vehicle frame and body relative to its wheels while cornering in either direction to offset centrifugal force in a manner resembling two wheeled vehicle cornering.

BRIEF DESCRIPTION OF THE DRAWINGS

FIG. 1 is a partially schematic plan view of a vehicle according to the invention with the upper body thereof omitted for clarity.

FIG. 2 is a side elevation of the vehicle, partly in section.

FIG. 3 is a fragmentary perspective view of vehicle steering and tilting means.

FIG. 4 is a fragmentary perspective view of the steering means taken from another viewpoint.

FIG. 5 is an enlarged fragmentary vertical section taken on line 5—5 of FIG. 3.

DETAILED DESCRIPTION

Referring to the drawings in detail wherein like numerals designate like parts, a passenger and/or cargo narrow track safety and economy vehicle comprises a main rigid frame 10 forming a perimeter guard or buffer entirely around the vehicle for maximum strength and safety in a collision situation. A framework 11 rising from the main perimeter frame 10 supports the upper body 12 of the vehicle which may roughly resemble the body of an automotive-type van or small cargo truck. The details of body construction may be conventional and are not important for a proper understanding of this invention.

Within the body 12 centrally is a driver's seat 13. Behind this seat, optically, are two or more passenger seats 14 and 15. In lieu of these passenger seats, the rear deck of the vehicle can be used for hauling cargo.

Rigid with the main frame 10 and projecting inwardly thereof are sturdy rear wheel well frames 16 of U-formation. These frames are utilized in conjunction with a tilting mechanism, to be described.

As stated, the track width of the vehicle can be as little as about three feet compared to standard automotive practice to achieve high maneuverability in city traffic. The vehicle is of the front wheel drive type having an engine 17 and associated transmission 18 mounted on the main frame 10 forwardly of the front steering axle 19 which is as swing axle. A differential gear 20 is included on the front swing axle housing and is drivingly coupled with a right angular bevel gear box 21 above it by a vertical axis splined driving shaft 22 defining the swing axis for the front steering axle 19. The front steering and traction wheels 23 of the vehicle are secured to driving axle sections 19' within the front axle housing, and operatively connected with the differential gear assembly 20. A manual gear shift lever 24 is provided for the transmission 18.

The heart of the invention resides in a unified steering and tilt control system for the vehicle which enables it to tilt during cornering to counteract centrifugal force in a manner similar to the operation of two wheeled vehicles during cornering.

More particularly, a vehicle master control lever 25 in ready reach of the driver includes a lower end rearward extension 25' extending at right angles to a transverse horizontal axis rocker shaft 27 journaled in a fixed bearing means 27'. The extension 25' of the master control lever has a reduced diameter pin extension 26 swiveled in a cross opening 26' of rocker shaft 27. By means of this connection shown particularly in FIG. 5, the master control lever 25, when swung fore and aft by the driver at its top end, will turn the rocker shaft 27 on its rotational axis, and the swivel connection afforded by the pin extension 26 will allow simultaneous swinging of the control lever 25 from side-to-side or laterally at its top by the driver for a purpose to be described.

The rocker shaft 27 has an attached steering crank arm 28 depending therefrom having a ball joint connection at 29 with a fore and aft shaftable steering link 30, in turn having its forward end pivotally connected at 31 with front swing axle 19 near one end of the same, FIG. 4. As a consequence of this arrangement, rearward swinging of the control lever 25 by the driver will advance the steering link 30 and swing the axle 19 in the proper direction to cause the vehicle to turn to the right when traveling forwardly. Simiilarly, pushing the control lever 25 forwardly at its top will retract the steering link 30 and cause the vehicle to turn to the left.

Somewhat above the rocker shaft 27, the vertical portion of control lever 25 extends through a longitudinally slotted cruciform link 32 having transverse arms 33 pivotally attached at 34 to a pair of horizontally swingable bell cranks 35, in turn pivotally supported at 36 on fixed support plates 37 extending from and rigid with the bevel gear box 21, FIG. 3.

The two bell cranks 35 are swingable in unison on their pivots 36 responsive to lateral shifting of slotted link 32 when the master control lever 25 is swung from side-to-side in either direction by the driver. Such swinging can take place simultaneously with fore or aft swinging of the master control lever to steer the vehicle by virtue of the longitudinal slot in the cruciform link 32. Thus, the control lever 25 operates similarly to an aircraft joy stick.

The bell cranks 35 are connected by long control rods 38 to rear bell cranks 39 which swing in vertical planes on pivot elements 40 held by brackets 41 rigid with the rear axle housing 42 of the vehicle. The rear axle 43 within the housing 42 mounts the vehicle rear wheels 44 which are disposed in the described wheel well frames 16 with suitable clearance. The horizontal arms of vertically swinging bell cranks 39 carry rounded cam bars 45 which engage cammingly under wheel well frames 16, FIGS. 1 and 3, to elevate them at proper times for the purpose of tilting the vehicle main frame 10 and the body of the vehicle laterally during cornering. For example, when rounding a curve to the right as a result of pulling the control lever 25 rearwardly, the driver will want the vehicle body to simultaneously lean or tilt to the right to counteract centrifugal force acting on the narrow track vehicle so that it will remain stable. To accomplish this, while rounding a curve to the right, the master control lever 25 will simultaneously be swung laterally to the right about the axis of swivel pin extension 26. This shifts slotted cruciform link 32 to the right, FIG. 3, and turns both bell cranks 35 clockwise on their pivots 36. As a result of this, the right hand camming bar 45 will be lowered, as viewed in FIGS. 2 and 3, and the left hand camming bar 45 will be raised relative to the overlying frame 16 by the action of the connected rod 38. This elevates the rigid wheel well frame 16 on the left side of the vehicle while lowering the right side frame 16, thus causing the main frame 10 and attached vehicle body 12 to lean or tilt to the right so as to counteract centrifugal force.

Similarly, while rounding a curve to the left, the control lever 25 is pushed forwardly, as previously described, and is simultaneously swung laterally to the left shifting the slotted link 32 to the left thereby elevating the right hand cam bar 45, FIG. 3, and lowering the left hand cam bar so that the vehicle body and frame will lean or tilt to the left, counteracting centrifugal force.

The vehicle main frame 10 and body 12 are resiliently suspended on single center leaf springs 46 and 47 at the front and rear ends of the vehicle. A lower full length leaf 48 of the rear spring 47 is fixed to the bottom of rear axle housing 42. The rear end of leaf 48, together with an overlapping half-leaf 49, is fixed through a bracket 50 to the rear of main frame 10. A short roll bar 51 fixed to full length leaf 48 engages below half-leaf 49 to assist the rear leaf spring 47 in twisting as a torsion spring on its longitudinal axis while simultaneously flexing vertically. This arrangement responds not only to roadway irregularities but promotes the described tilting of the vehicle while negotiating curves.

The front spring unit 46 operates in the same manner and includes a lower full length spring leaf 52, an upper halflength leaf 53, and an intervening roll bar 54 serving the same purpose as the roll bar 51. The rear end of leaf 52 rests on and is attached pivotally to the differential 20.

In cases where the vehicle is traveling on a surface which is laterally tilted, as on the side of a hill or a sloping beach, the control lever 25 can be swung laterally to compensate for this by leveling the vehicle main frame even though the lever 25 is not being employed in a fore and aft mode for turning the vehicle.

The vehicle, as described, is highly maneuverable, stable, safe and very sturdy. It is comparatively lightweight and therefore fuel saving. It is simplified in construction and therefore economical to manufacture. It fills a need in the art not satisfied by any known vehicle.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A narrow track economy vehicle comprising a united main frame and vehicle body, a rear axle for the vehicle having narrow track rear wheels, a front swing axle for steering the vehicle having a pair of narrow track front wheels, front wheel power drive means for the vehicle, spring suspension means for the vehicle coupled between the vehicle main frame and said rear and front swing axles, a master control lever for the vehicle, a transverse axis rocker shaft coupled to the control lever and being turned by the swinging of the control lever in a fore and aft direction, the control lever being swiveled with relation to the rocker shaft for simultaneous swinging from side-to-side in either direction, a steering linkage coupled between the rocker shaft and front swing axle whereby fore and aft swinging of the control lever can effect steering of the vehicle by turning the swing axle in opposite directions, and an additional linkage including a laterally shiftable slotted link engaged with the control lever and shifted thereby when the control lever is swung from side-to-side, and said additional linking including camming means coupled with said laterally shiftable slotted link and acting on said main frame to elevate one side of the main frame to thereby tilt the united main frame and vehicle body in one direction while the vehicle is negotiating a curve.

2. In a motor vehicle comprising a main frame, chassis and yielding suspension means, the chassis including a swing axle for steering the vehicle, the improvement comprising a master universally swingable control lever on the vehicle, a first linkage means interconnecting said lever with said swing axle and responding to fore and aft swinging of said lever to steer the vehicle, a second linkage means operatively connected with said lever and responding to lateral swinging of the lever to cause lateral tilting of the main frame to counteract centrifugal force when the vehicle is rounding a curve, said second linkage means having a main frame engaging element, the second linkage means including a pair of coacting camming elements engaging beneath parts of the main frame near opposite sides thereof, said camming elements being carried by vertically swingable bell cranks on the rear axle of said chassis, said second linkage means further comprising a longitudinally slotted link receiving said lever and being bodily shiftable laterally with lateral swinging movements of the lever, horizontal ball cranks connected with opposite sides of said slotted link, and connecting rods between the first and second named bell cranks.

3. A motor vehicle as defined in claim 2, and said camming elements comprising transverse camming bars having rounded upper camming faces.

4. In a motor vehicle comprising a main frame, chassis and yielding suspension means, the chassis including a swing axle for steering the vehicle, the improvement comprising a master universally swingable control lever on the vehicle, a first linkage means interconnecting said lever with said swing axle and responding to fore and aft swinging of said lever to steer the vehicle, a second linkage means operatively connected with said lever and responding to lateral swinging of the lever to cause lateral tilting of the main frame to counteract centrifugal force when the vehicle is rounding a curve, said second linkage means having a main frame engaging element, said first linkage means comprising a steering link connected with said swing axle on one side of the pivot of the swing axle, a crank arm connected with the steering link to actuate it, a transverse axis rocker shaft connected with the crank arm to swing it, and means forming a swiveled connection between the rocker shaft and a bottom longitudinal extension of said lever whereby fore and aft swinging of the crank arm effects turning of said rocker shaft.

* * * * *